United States Patent
Dooley et al.

(10) Patent No.: US 7,690,318 B2
(45) Date of Patent: Apr. 6, 2010

(54) METHOD OF SEWING A DECORATIVE SEAM AND TRIM COMPONENT MADE BY THAT METHOD

(75) Inventors: David J. Dooley, Troy, MI (US); Randy S. Reed, Fair Haven, MI (US); Thomas K. Bush, Harrison Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 190 days.

(21) Appl. No.: 11/869,262

(22) Filed: Oct. 9, 2007

(65) Prior Publication Data

US 2009/0090285 A1 Apr. 9, 2009

(51) Int. Cl.
*D05B 35/02* (2006.01)
*D05B 15/00* (2006.01)

(52) U.S. Cl. .............................. 112/475.17
(58) Field of Classification Search ............ 112/470.27, 112/137–153, 48, 51, 52, 475.06, 475.08, 112/417–426
See application file for complete search history.

(56) References Cited

U.S. PATENT DOCUMENTS

| | | | | |
|---|---|---|---|---|
| 2,079,569 A | * | 5/1937 | Christensen | 112/475.01 |
| 2,174,831 A | * | 10/1939 | Muller | 112/424 |
| 2,353,984 A | * | 7/1944 | Barone | 112/414 |
| 2,448,495 A | * | 8/1948 | Muecke | 112/475.26 |
| 2,902,955 A | * | 9/1959 | Dunkerly et al. | 112/60 |
| 3,201,801 A | * | 8/1965 | Airasian | 2/93 |
| 3,671,984 A | * | 6/1972 | Ambrose | 5/402 |
| 3,940,812 A | * | 3/1976 | DiForti et al. | 112/418 |
| 5,492,073 A | * | 2/1996 | Abraham | 112/441 |
| 6,116,175 A | * | 9/2000 | Ito | 112/475.06 |
| 6,792,883 B2 | * | 9/2004 | Ashton | 112/475.01 |
| 6,886,479 B1 | * | 5/2005 | Hori | 112/475.06 |
| 6,935,260 B2 | | 8/2005 | Kromm et al. | |
| 6,997,126 B2 | | 2/2006 | Murley | |
| 2003/0168151 A1 | | 9/2003 | Wright et al. | |
| 2005/0081770 A1 | | 4/2005 | Murley et al. | |
| 2005/0081771 A1 | | 4/2005 | Kromm et al. | |
| 2005/0188907 A1 | | 9/2005 | D'Henin | |
| 2007/0014969 A1 | | 1/2007 | Olley et al. | |
| 2007/0022931 A1 | | 2/2007 | Wieczorek et al. | |

FOREIGN PATENT DOCUMENTS

JP 03-099832 A 4/1991

* cited by examiner

*Primary Examiner*—Ismael Izaguirre
(74) *Attorney, Agent, or Firm*—Brooks Kushman P.C.

(57) ABSTRACT

A method of sewing a decorative seam includes providing a material suitable for receiving stitches, folding a first portion of the material onto a second portion of the material to form a bend, sewing a first stitch to join the first portion to the second portion, the stitch being substantially parallel to the bend and spaced apart therefrom, the first stitch forming a seam, unfolding the material and sewing a second and third stitch into the material such that the second and third stitches are substantially parallel to the seam and arranged such that the second and third stitches are on opposite sides of the seam.

20 Claims, 4 Drawing Sheets

METHOD OF SEWING A DECORATIVE SEAM AND TRIM COMPONENT MADE BY THAT METHOD

BACKGROUND OF THE INVENTION

1. Field of the Invention

The field of this invention relates to a method of sewing a decorative seam into a material used in an automotive trim component and an automotive trim component having the decorative seam made using the method.

2. Background Art

A method of sewing a decorative seam and an automotive trim component having the decorative seam made by the method is disclosed herein. Examples of decorative seams are disclosed in U.S. Pat. Nos. 6,997,126 and 6,935,260 and in U.S. Publication Nos. 2007/0022931; 2005/0188907; 2005/0081771; and 2005/0081770.

SUMMARY OF THE INVENTION

In a first aspect of the invention, a method of sewing a decorative seam into a material used in an automotive trim component is disclosed. In a first embodiment, the method comprises providing a material suitable for receiving stitches. A first portion of the material is folded over onto a second portion of the material to form a bend. A first stitch is sewn along a length of the material to join the first portion of the material to the second portion of the material. The first stitch is substantially parallel to the bend and spaced apart therefrom. The first stitch forms a seam between the first and the second portions of the material. The material is unfolded and a second and a third stitch are sewn into the material. The second and third stitches are spaced apart from, and are substantially parallel to, the seam and arranged such that the second and third stitches are on opposite sides of the seam.

In at least one implementation of the first embodiment, the first stitch is sewn proximate to the bend.

In at least another implementation of the first embodiment, the method further comprises the step of providing a single needle sewing machine and a guide. The first stitch is sewn using the single needle sewing machine. The material is positioned such that the bend is disposed against the guide and the material slides along the guide as the first stitch is sewn to provide a substantially constant distance between the first stitch and the bend.

In at least another implementation of the first embodiment, the material has a surface layer and a hidden surface. The material is folded such that the surface layer is interior of the hidden surface when the first stitch is sewn.

In at least another implementation of the first embodiment, the second and third stitches are sewn substantially equidistant from the seam.

In at least another implementation of the first embodiment, the method further comprises the step of providing a double needle sewing machine. The double needle sewing machine is used to simultaneously sew the second and third stitches. In at least one variation of this implementation, the double needle sewing machine comprises a trough and the method further comprises the step of positioning the bend within the trough prior to sewing the second and third stitches. In another variation of this implementation, the second and third stitches are sewn such that the seam is substantially centered between the second and the third stitches.

In at least a second embodiment of the invention, a method is disclosed for fabricating an automotive trim component including a material having a decorative seam. The method comprises providing a material suitable for receiving stitches. A first portion of the material is folded over onto a second portion of the material to form a bend. A first stitch is sewn along a length of the material to join the first portion of the material to the second portion of the material. The first stitch is substantially parallel to the bend and spaced apart therefrom. The first stitch forms a seam between the first and the second portions of the material. The material is unfolded and a second and a third stitch is sewn into the material. The second and third stitches are spaced apart from, and are substantially parallel to, the seam and are arranged such that the second and third stitches are on opposite sides of the seam. A substrate is provided and the material is attached to the substrate such that the second and the third stitches and the seam are visible.

In at least one implementation of the second embodiment, the step of attaching the material to the substrate includes applying an adhesive to at least one of the material and the substrate and then pressing the material onto the substrate.

In at least another implementation of the second embodiment, the substrate includes a trough for receiving the bend and the method further comprises the step of aligning the bend with the trough.

In at least another implementation of the second embodiment, the step of attaching the material to the substrate comprises insert molding the material onto the substrate.

In at least another implementation of the second embodiment, the method further comprises the step of providing a single needle sewing machine and a guide. The first stitch is sewn using the single needle sewing machine. The material is positioned such that the bend is disposed against the guide and the material slides along the guide as the first stitch is sewn to provide a substantially constant distance between the first stitch and the bend. In at least one variation of this implementation, the method further comprises the step of providing a double needle sewing machine wherein the double needle sewing machine is used to simultaneously sew the second and the third stitches. In a further variation of this implementation, the material is a multi-layered material comprising a surface layer, a foam surface adjacent the surface layer, and a backing surface adjacent the foam surface. The material is folded such that the surface layer is interior of the foam and the backing surfaces when the first stitch is sewn. The first stitch may be sewn proximate the bend.

In a second aspect of the invention, an automotive trim component having a decorative seam is disclosed. In a third embodiment of the invention, the trim component comprises a substrate and a cover stock assembly including a material having a surface layer and a hidden surface. The material also has a bend and a first stitch sewn into the hidden surface of the material proximate the bend to form a seam in the surface layer. The material further includes a second and third stitch sewn into the surface layer of the material and arranged substantially parallel to the seam such that the seam is substantially centered between the second and third stitches. The cover stock assembly is attached to the substrate such that the surface layer, the seam, the second and the third stitches are visible.

In at least one variation of the third embodiment, the cover stock includes a foam layer adjacent the hidden surface. In a further variation of this implementation, the cover stock includes a backing material adjacent the foam material.

In at least another implementation of the third embodiment, the material is selected from a group consisting of vinyl and cloth.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
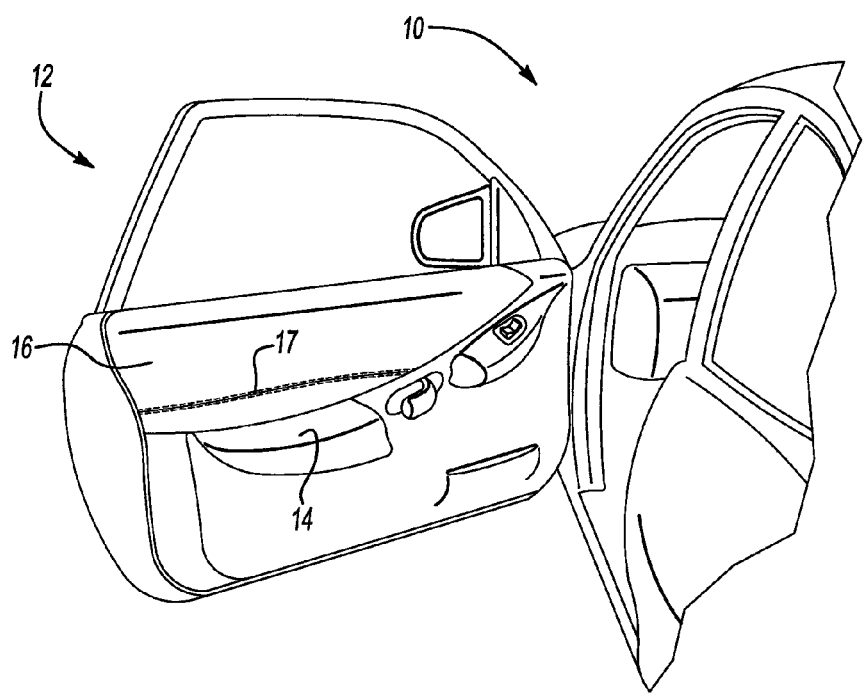
FIG. 1 is a perspective view of an automobile equipped with an interior trim component having a decorative seam made in accordance with an embodiment of the method of the present invention.
Figure 2:
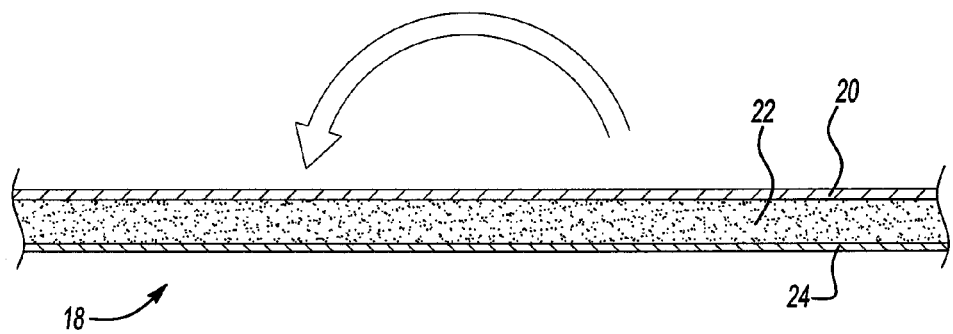
FIG. 2 is a fragmented cross sectional view of a cover stock assembly prior to sewing the decorative seam of FIG. 1.

With reference to FIG. 1, an automotive vehicle 10 is illustrated having a door assembly 12 equipped with an armrest member 14 and an interior trim component 16 having a decorative seam 17 sewn using an embodiment of the method of the present invention. Interior trim component 16 is a cushion disposed adjacent armrest member 14 to provide a soft contact area for a vehicle occupant resting an arm on armrest member 14. Those of ordinary skill in the art will recognize that the decorative seam 17 sewn onto interior trim component 16 may also be disposed on other interior trim components such as a vehicle's instrument panel, a center console, fabric used to cover a vehicle's seat, a steering wheel cover, a headliner and virtually any other surface within automotive vehicle 10.

FIGS. 2-5B illustrate an embodiment of a method of sewing the decorative seam 17 illustrated in FIG. 1 into a cover stock assembly 18. FIG. 1 illustrates a portion of cover stock assembly 18 that may be used to cover a substrate and which, together with the substrate, may form an interior trim component such as interior trim component 16. In the illustrated embodiment, cover stock assembly 18 comprises three layers including a surface layer 20, a foam layer 22 and a backing layer 24. The surface layer 20 may provide a class A surface and may be made of materials including leather, vinyl, cloth or any other fabric suitable for receiving stitches. Foam layer 22 may be made of materials including, but not limited to, urethane, polypropylene, PVC, and polyethylene. Foam layer 22 provides cushioning behind surface layer 20 to provide a more comfortable and pleasing tactile sensation when a person contacts surface layer 20. Backing layer 24 serves as an interface between foam layer 22 and substrate 26 (see FIG. 6 and 7B) and can be made from materials including, but not limited to, woven fabric scrims, non-woven felts, non woven scrims and films such as Polypropylene, and polyethylene.

Figure 3A:
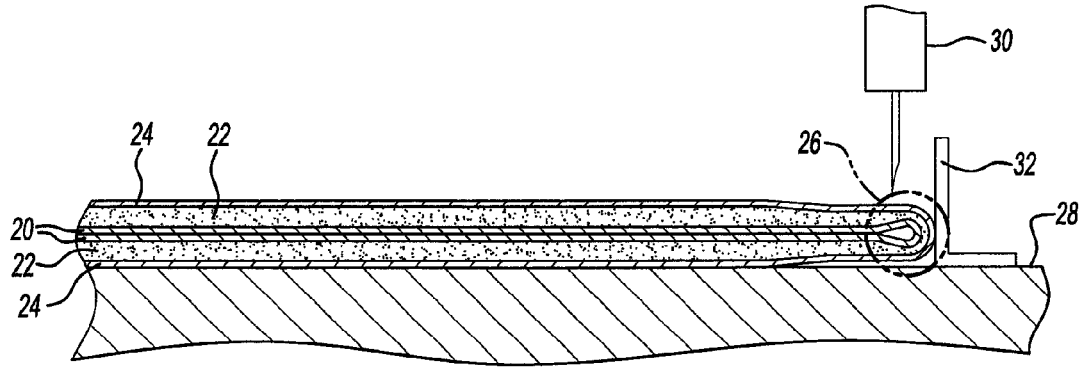
FIG. 3A is a fragmented cross sectional view illustrating the cover stock assembly of FIG. 2 after it has been folded over and positioned proximate a sewing machine.

In the illustrated embodiment, the first step is to fold cover stock assembly 18 over onto itself to form a bend 26 (see FIG. 3A). Cover stock assembly 18 may be folded in half or in any other division depending upon where it is desired to locate the decorative seam 17 on cover stock assembly 18. Cover stock assembly 18 has been folded such that surface layer 20 is sandwiched between two halves of foam layer 22 and backing layer 24.

Figure 3B:
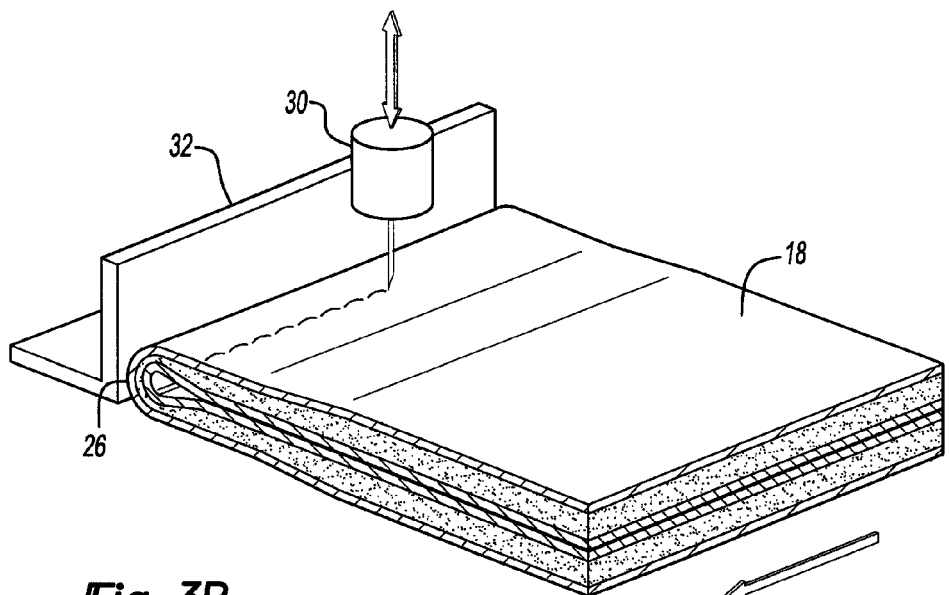
FIG. 3B is perspective view illustrating the folded cover stock assembly of FIG. 3A as a first stitch is sewn along a bend in the cover stock assembly.

As illustrated in FIG. 3A, the folded cover stock assembly 18 has been positioned on a substantially first flat surface 28 under a single needle sewing machine 30 and positioned such that bend 26 abuts up against straight edge or fence 32. In other embodiments, a fence or straight edge need not be utilized. As illustrated in FIG. 3B, the folded cover stock assembly 18 is pushed along fence 32 as single needle sewing machine 30 sews a first stitch 34 (see FIG. 4B) through both halves of folded cover stock assembly 18. In the embodiment illustrated in FIG. 4B, first stitch 34 is disposed proximate bend 26. In other embodiments, first stitch 34 may be sewn closer to or further from bend 26, as desired. Fence 32 allows an operator of sewing machine 30 to sew each individual stitch of first stitch 34 at substantially the same distance from bend 26.

Figure 4A:
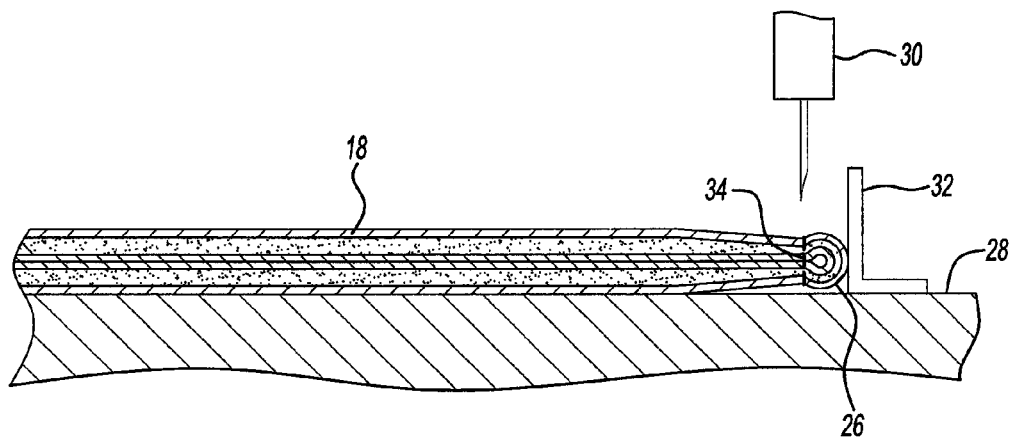
FIG. 4A is a fragmented cross sectional view of the cover stock assembly of FIG. 3A after the first stitch has been sewn proximate the bend in the cover stock assembly.
Figure 4B:
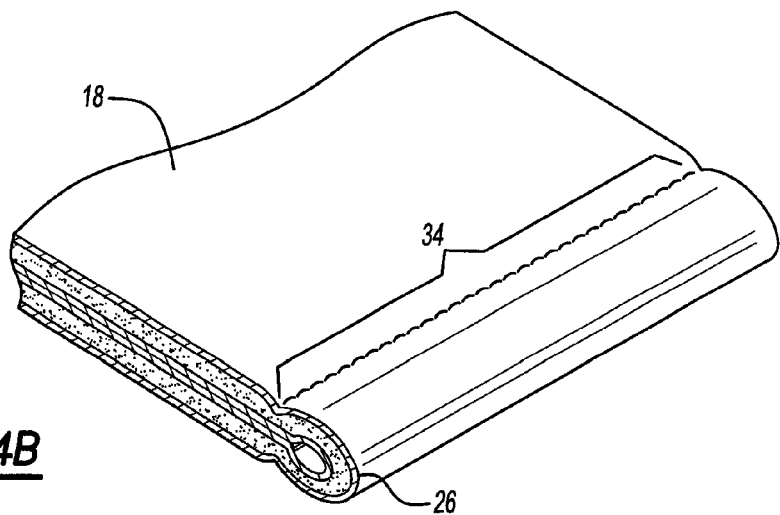
FIG. 4B is a perspective view illustrating the cover stock assembly of FIG. 4A after the first stitch has been sewn along a length of the cover stock assembly proximate the beam.

With reference to FIG. 4A, folded cover stock assembly 18 is illustrated in cross sectional view after first stitch 34 has been sewn through both halves of folded cover stock assembly 18, joining them. The first stitch 34 allows cover stock assembly 18 to retain bend 26 after cover stock assembly 18 is unfolded.

Figure 5A:
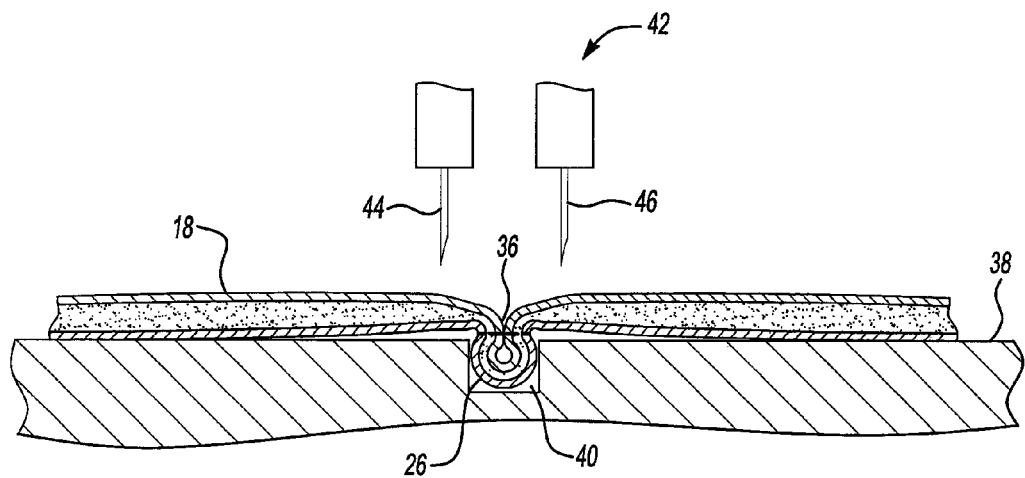
FIG. 5A is a fragmented cross sectional view of the cover stock assembly of FIG. 4A after it has been unfolded and disposed on a surface proximate a sewing machine having dual needles.

With reference to FIG. 5A, cover stock assembly 18 is unfolded and positioned on a second flat surface 38 which includes a trough 40 to receive bend 26, thereby preventing the upward facing surface of cover stock assembly 18 from bulging above bend 26 when disposed on second flat surface 38. First stitch 34 retains bend 26 in cover stock assembly 18 and also forms seam 36 in cover stock assembly 18. A dual needle sewing machine 42 is positioned over cover stock assembly 18 such that first needle 44 is disposed above and to the left of seam 36 and second needle 46 is disposed above and to the right of seam 36. In the illustrated embodiment, seam 36 is approximately centered between the first and the second needles 44, 46. In other embodiments, dual needle sewing machine 42 may be positioned such that seam 36 is closer to either first needle 44 or second needle 46.

Figure 5B:
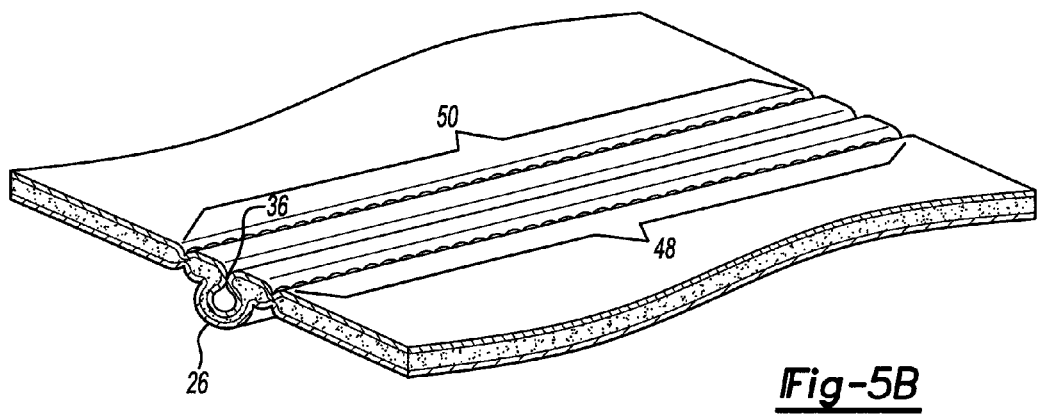
FIG. 5B is a perspective view of the cover stock assembly of FIG. 5A after second and third stitches have been sewn in the cover stock assembly straddling the seam formed by the first stitch.

FIG. 5B illustrates cover stock assembly 18 after second stitch 48 and third stitch 50 have been sewn on either side of seam 36. Seam 36 and second and third stitches 48, 50 together comprise the decorative seam 17 made using an embodiment of the method of the present invention.

Figure 6:
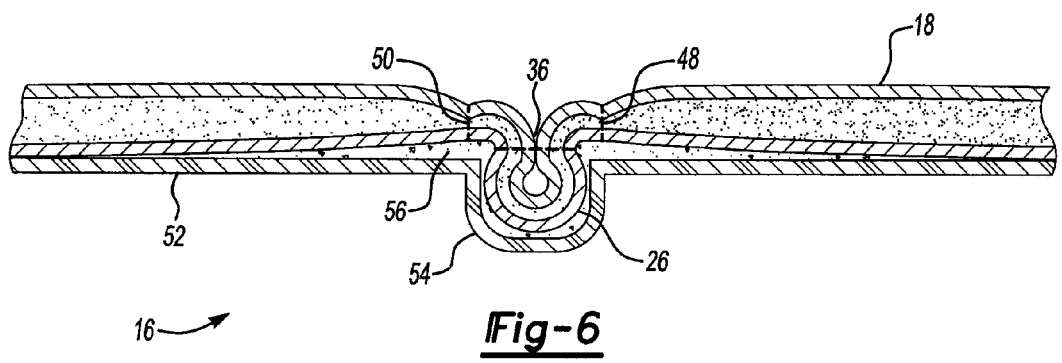
FIG. 6 is a cross-sectional view of an embodiment of an automotive trim component assembled with the cover stock assembly of FIG. 5A.

FIG. 6 is a fragmented cross sectional view of an embodiment of an interior trim component 16. Interior trim component 16 includes a substrate 52 which maybe made from materials including acrylonitrile butadiene styrene (ABS) polypropylene, rigid urethane, glass reinforced rigid urethane, srim, wood fiber phenolic resin, and wood stock (wood flower reinforced poly propylene. Substrate 52 includes a depression 54 to accommodate bend 26. An adhesive 56 may be applied to backing layer 24 or substrate 52 or both, bend 26 may be aligned within depression 54 and cover stock assembly 18 may be pressed together by hand or machine with substrate 52 to form interior trim component 16.

Figure 7A:
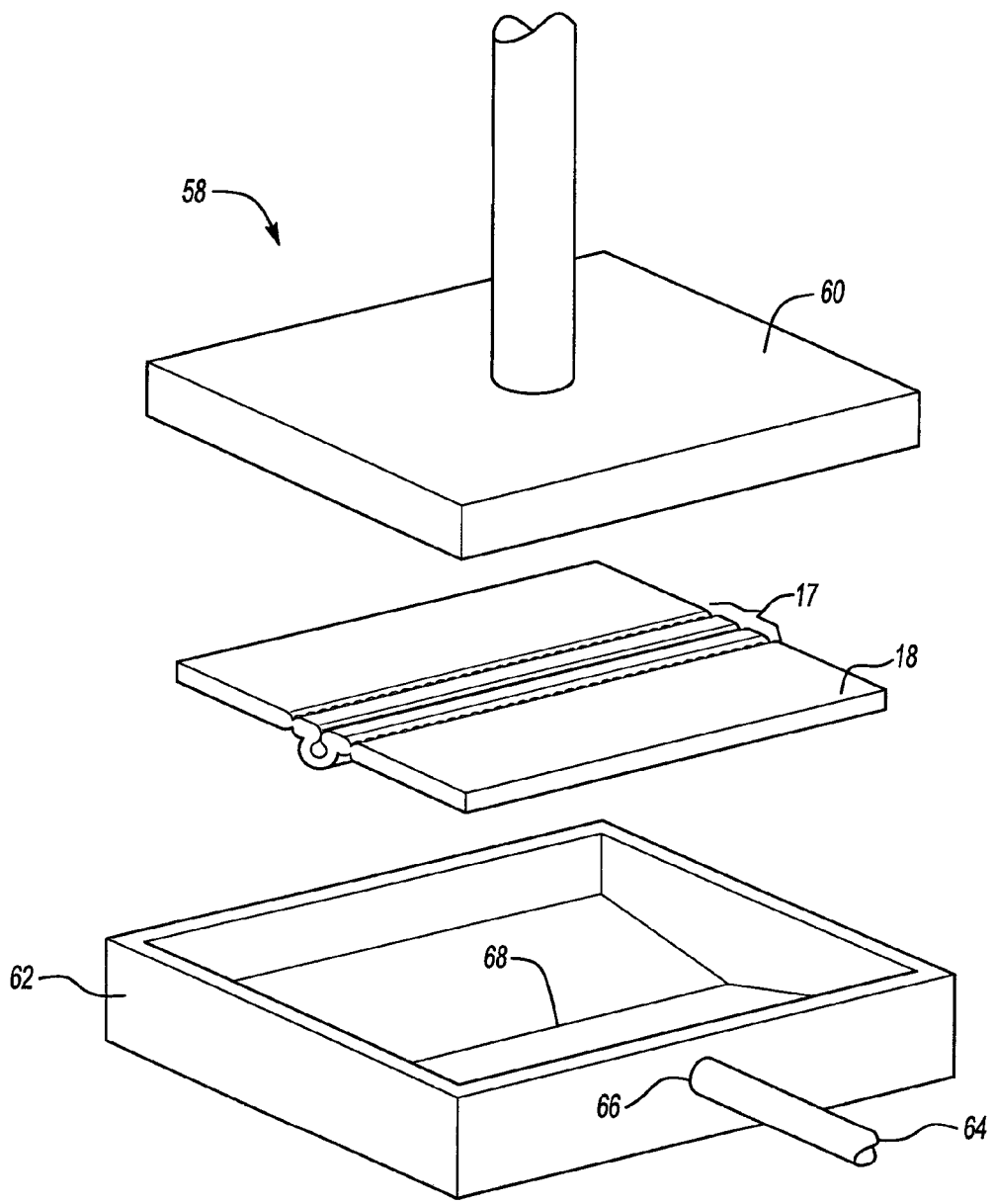
FIG. 7A is a perspective view of an insert molding operation utilizing the cover stock assembly of FIG. 5A.

Alternatively, interior trim component 16 may be fabricated using an insert molding process illustrated in FIG. 7A. In FIG. 7A, a mold 58 includes a cavity portion 60 and a core portion 62. Core 62 includes a runner 64 to transport molten resin into mold 58. The molten resin (not shown) enters core 62 through gate 66. In operation, cover stock assembly 18 is inserted into mold 58 between cavity 60 and core 62. Cover stock assembly 18 is positioned above gate 66. Cover stock assembly 18 is positioned in mold 58 such that bend 26 is aligned with fold 68 in the bottom of core 62. Fold 68 permits a thickened region in interior trim component 16 to accommodate the additional thickness in cover stock assembly 18 caused by bend 26. Cavity 60 comes down and closes mold 58. Molten resin is introduced into core 62 through gate 66 and fills the space in core 62 below cover stock assembly 18. In some embodiments, the molten resin will actually infiltrate a portion of cover stock assembly 18 and solidify to form a mechanical bond between cover stock assembly 18 and substrate 52. In other embodiments, substrate 52 and a portion of cover stock assembly 18 may be compatible or the same such that a chemical bond is formed between substrate 52 and cover stock assembly 18. At the end of the cycle, cavity 60 is retracted and the completed interior trim component 16 is removed from mold 58.

Figure 7B:
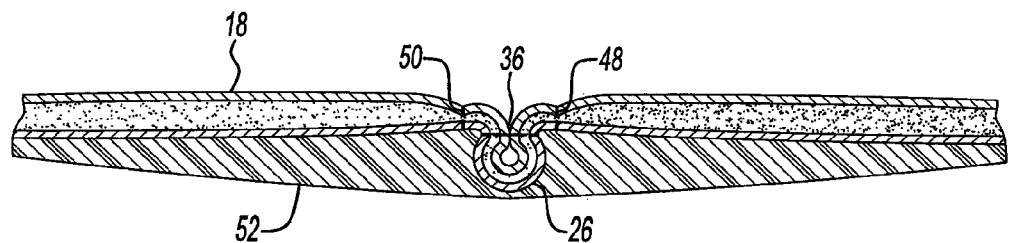
FIG. 7B is a cross-sectional view of a second embodiment of an automotive interior trim component made using the insert mold of FIG. 7A and a cover stock assembly of FIG. 5A.

FIG. 7B illustrates an embodiment of interior trim component 16 fabricated using an insert molding technique. As illustrated, substrate 52 is form fitted around bend 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of sewing a decorative seam into a material used in an automotive trim component, the method comprising:

providing a layer of material suitable for receiving stitches;

folding a first portion of the layer of material over onto a second portion of the layer of material to form a bend in the layer of material;

sewing a first stitch along a length of the layer of material to join the first portion of the layer of material to the second portion of the layer of material, the first stitch being substantially parallel to the bend and spaced apart therefrom, the first stitch forming a seam between the first and the second portions of the layer of material;

unfolding the layer of material; and sewing a second and a third stitch into the layer of material, the second and third stitches being spaced apart from, and substantially parallel to, the seam and arranged such that the second and third stitches are on opposite sides of the seam.

2. The method of claim 1 wherein the first stitch is sewn proximate the bend.

3. The method of claim 1 further comprising the step of providing a single needle sewing machine and a guide, wherein the first stitch is sewn using the single needle sewing machine and wherein the material is positioned such that the bend is disposed against the guide and the material slides along the guide as the first stitch is sewn to provide a substantially constant distance between the first stitch and the bend.

4. The method of claim 1 wherein the material has a surface layer and a hidden surface and wherein the material is folded such that the surface layer is interior of the hidden surface when the first stitch is sewn.

5. The method of claim 1 wherein the second and third stitches are sewn substantially equidistant from the seam.

6. The method of claim 1 further comprising the step of providing a double needle sewing machine wherein the double needle sewing machine is used to simultaneously sew the second and the third stitches.

7. The method of claim 6 wherein the double needle sewing machine comprises a trough, the method further comprising the step of positioning the bend within the trough prior to sewing the second and third stitches.

8. The method of claim 6 wherein the second and the third stitches are sewn such that the seam is substantially centered between the second and the third stitches.

9. A method of fabricating an automotive trim component including material having a decorative seam, the method comprising:

providing a material suitable for receiving stitches;

folding a first portion of the material over onto a second portion of the material to form a bend;

sewing a first stitch along a length of the material to join the first portion of the material to the second portion of the material, the first stitch being substantially parallel to the bend and spaced apart therefrom, the first stitch forming a seam between the first and the second portions of the material;

unfolding the material;

sewing a second and a third stitch into the material, the second and third stitches being spaced apart from, and substantially parallel to, the seam and arranged such that the second and third stitches are on opposite sides of the seam;

providing a substrate; and attaching the material to the substrate.

10. The method of claim 9 wherein the step of attaching the material to the substrate includes applying an adhesive to at least one of the material and the substrate and then pressing the material onto the substrate.

11. The method of claim 9 wherein the substrate includes a trough for receiving the bend, the method further comprising the step of aligning the bend with the trough.

12. The method of claim 9 wherein the step of attaching the material to the substrate comprises insert molding the material onto the substrate.

13. The method of claim 9 further comprising the step of providing a single needle sewing machine and a guide, wherein the first stitch is sewn using the single needle sewing machine and wherein the material is positioned such that the bend is disposed against the guide and the material slides along the guide as the first stitch is sewn to provide a substantially constant distance between the first stitch and the bend.

14. The method of claim 13 further comprising the step of providing a double needle sewing machine wherein the double needle sewing machine is used to simultaneously sew the second and the third stitches.

15. The method of claim 14 wherein the material is a multi-layered material comprising a surface layer, a foam surface adjacent the surface layer and a backing surface adjacent the foam surface and wherein the material is folded such that the surface layer is interior of the foam and the backing surfaces when the first stitch is sewn.

16. The method of claim 15 wherein the first stitch is sewn proximate the bend.

17. An automotive trim component including a cover stock assembly having a decorative seam, the trim component comprising:
   a substrate; and
   a cover stock assembly comprising a material having a surface layer and a hidden surface, the material having a bend and a first stitch sewn into the hidden surface of material proximate the bend to form a seam in the surface layer, a second and third stitch sewn into the surface layer of the material and arranged substantially parallel to the seam such that the seam is substantially centered between the second and third stitches, the cover stock assembly being attached to the substrate such that the surface layer, the seam, the second and the third stitches are visible.

18. The trim component of claim 17 wherein the cover stock assembly further comprises a foam layer adjacent the hidden surface.

19. The trim component of claim 18 wherein the cover stock assembly further comprises a backing material adjacent the foam layer.

20. The trim component of claim 17 wherein the material is selected from a group consisting of vinyl and cloth.

\* \* \* \* \*